United States Patent
Lindholm et al.

(10) Patent No.: US 11,237,814 B2
(45) Date of Patent: Feb. 1, 2022

(54) SYSTEM AND METHOD FOR SUPPORTING CUSTOM HOOKS DURING PATCHING IN AN APPLICATION SERVER ENVIRONMENT

(71) Applicant: ORACLE INTERNATIONAL CORPORATION, Redwood Shores, CA (US)

(72) Inventors: Jacob Lindholm, Londonderry, NH (US); Yamini Kalyandurga Balasubramanyam, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/028,700

(22) Filed: Jul. 6, 2018

(65) Prior Publication Data

US 2019/0056926 A1    Feb. 21, 2019

Related U.S. Application Data

(60) Provisional application No. 62/546,883, filed on Aug. 17, 2017.

(51) Int. Cl.
*G06F 8/65*     (2018.01)
*G06F 9/50*     (2006.01)
*H04L 29/08*    (2006.01)

(52) U.S. Cl.
CPC .............. *G06F 8/65* (2013.01); *G06F 9/5038* (2013.01); *G06F 9/5077* (2013.01); *H04L 67/34* (2013.01); *H04L 67/10* (2013.01)

(58) Field of Classification Search
CPC ........ G06F 8/65; G06F 9/5038; G06F 9/5077; H04L 67/34; H04L 67/10

(Continued)

(56) References Cited

U.S. PATENT DOCUMENTS 9,696,985 B1 *    7/2017   Gupta ........................ G06F 8/65
2006/0195818 A1 * 8/2006   Berg .......................... G06F 8/10
                                                                        717/116

(Continued)

FOREIGN PATENT DOCUMENTS

CN    103124967    5/2013
CN    103365683    10/2013

(Continued)

OTHER PUBLICATIONS

Chinese Office Action, dated May 23, 2019 for Chinese Patent Application No. 201580051272.7, 10 pages.

(Continued)

*Primary Examiner* — Chat C Do
*Assistant Examiner* — Bradford F Wheaton
(74) *Attorney, Agent, or Firm* — Tucker Ellis LLP

(57) ABSTRACT

In accordance with an embodiment, described herein is a system and method for providing support for custom hooks during patching in an application server, enterprise, cloud computing, or other computing environment. A patch orchestration engine generates a patching workflow including a series of steps that apply patches to update one or more targeted nodes in a controlled manner with minimal downtime. Custom hooks provide a flexible mechanism that enables modifying phases of the patching workflow that can be associated with extension points. When an extension, for example an additional Java software code, script or other command, is specified to be run at a particular extension point associated with a particular phase of a patching workflow, the patch orchestration engine causes the extension to be inserted into the patching workflow, for execution during patching of the targeted nodes, to modify that phase of the patching workflow.

17 Claims, 10 Drawing Sheets

(58) Field of Classification Search
USPC .......................................................... 717/168
See application file for complete search history.

(56) References Cited

U.S. PATENT DOCUMENTS

| | | | | |
|---|---|---|---|---|
| 2007/0136278 | A1* | 6/2007 | Grazioli | ................ G06F 9/4493 |
| 2007/0156913 | A1* | 7/2007 | Miyamoto | .......... G06F 9/44526 |
| | | | | 709/230 |
| 2009/0259999 | A1 | 10/2009 | Srinivasan | |
| 2010/0017794 | A1* | 1/2010 | Waters | ...................... G06F 8/65 |
| | | | | 717/171 |
| 2011/0161949 | A1 | 6/2011 | Kodaka | |
| 2012/0054732 | A1 | 3/2012 | Jain et al. | |
| 2013/0262689 | A1 | 10/2013 | Schmidt et al. | |
| 2014/0101644 | A1* | 4/2014 | Buzaski | ..................... G06F 8/65 |
| | | | | 717/168 |
| 2015/0370549 | A1* | 12/2015 | Zhang | ....................... G06F 8/65 |
| | | | | 717/172 |
| 2016/0085543 | A1* | 3/2016 | Islam | .................. G06F 11/1433 |
| | | | | 717/171 |
| 2017/0249177 | A1* | 8/2017 | Liggitt | ...................... G06F 8/38 |
| 2018/0101583 | A1* | 4/2018 | Li | ......................... G06F 16/254 |
| 2018/0181439 | A1* | 6/2018 | Jackson | ................ G06F 9/5016 |

FOREIGN PATENT DOCUMENTS

| | | |
|---|---|---|
| JP | H03-097030 | 4/1991 |
| JP | 2004-102379 | 4/2004 |
| JP | 2005092803 | 4/2005 |
| JP | 2011257847 | 12/2011 |
| JP | 2012527027 | 11/2012 |
| WO | 2006040810 | 4/2006 |
| WO | 2011162991 | 12/2011 |
| WO | 2012054160 | 4/2012 |

OTHER PUBLICATIONS

Communication pursuant to Article 94(3) EPC, dated Jun. 12, 2019 for EP Application No. 15778471.1, 8 pages.
Japanese Office Action dated Aug. 27, 2019 for Japanese Patent Application No. 2017-516114, 5 pages.
Shimamura, et al., "Research Developments that serve a future underlying cloud technology", NEC Technical Journal, NEC Corporation, Apr. 23, 2010, vol. 63, No. 2, pp. 114-118, 6 pages.
Sase, "Complete Manual of RAC System Construction to Maximize Introduction Effects", DB Magazine Aug. 2005, vol. 15, Issue 4, pp. 93-105, 14 pages.
Japanese Patent Office, Office Action dated Mar. 10, 2020 for Japanese Patent Application No. 2017-516114, 6 pages.
Indian Patent Office, First Examination Report dated Jun. 9, 2020 for Indian Patent Application No. 201747014026, 6 pages.
United States Patent and Trademark Office, Notice of Allowance dated Jul. 27, 2020 for U.S. Appl. No. 16/525,212, 20 pages.
United States Patent and Trademark Office, Notice of Allowance dated Jul. 29, 2020 for U.S. Appl. No. 16/398,887, 21 pages.

\* cited by examiner

SYSTEM AND METHOD FOR SUPPORTING CUSTOM HOOKS DURING PATCHING IN AN APPLICATION SERVER ENVIRONMENT

CLAIM OF PRIORITY

This application claims the benefit of priority to U.S. Provisional Application titled "SYSTEM AND METHOD FOR SUPPORTING CUSTOM HOOKS DURING PATCHING IN AN APPLICATION SERVER ENVIRONMENT", Application No. 62/546,883, filed Aug. 17, 2017; and is related to U.S. patent applications titled "SYSTEM AND METHOD FOR SUPPORTING PATCHING IN A MULTI-TENANT APPLICATION SERVER ENVIRONMENT", application Ser. No. 14/864,695, filed Sep. 24, 2015, issued as U.S. Pat. No. 9,405,530 on Aug. 2, 2016; "SYSTEM AND METHOD FOR SUPPORTING PATCHING IN A MULTITENANT APPLICATION SERVER ENVIRONMENT", application Ser. No. 15/098,839, filed Apr. 14, 2016, issued as U.S. Pat. No. 9,916,153 on Mar. 13, 2018; "SYSTEM AND METHOD FOR SUPPORTING PATCHING IN A MULTITENANT APPLICATION SERVER ENVIRONMENT", application Ser. No. 15/466,267, filed Mar. 22, 2017, published as U.S. Patent Application Publication No. 2017/0192772; and "SYSTEM AND METHOD FOR SUPPORTING PATCHING IN A MULTITENANT APPLICATION SERVER ENVIRONMENT", application Ser. No. 15/890,601, filed Feb. 7, 2018, published as U.S. Patent Application Publication No. 2018/0165087; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application server, enterprise, cloud computing, or other computing environments, and are particularly related to a system and method for providing support for custom hooks during patching in such environments.

BACKGROUND

In an application server, enterprise, cloud computing, or other computing environment, a common administrative task is the need to patch a series of application server instances or nodes operating within a domain. The application of a patch may include, for example, applying a one-off fix for a specific problem, or installing a periodic version update, and typically requires an administrator to perform a series of steps on each node of a domain, to rollout the patch while minimizing application downtime. Since patching is a complex process, potentially taking hours when a patch is being applied to many nodes, such environments can benefit from features that assist during the patching process, to improve patching performance or flexibility.

SUMMARY

In accordance with an embodiment, described herein is a system and method for providing support for custom hooks during patching in an application server, enterprise, cloud computing, or other computing environment. A patch orchestration engine generates a patching workflow including a series of steps that apply patches to update one or more targeted nodes in a controlled manner with minimal downtime. Custom hooks provide a flexible mechanism that enables modifying phases of the patching workflow that can be associated with extension points. When an extension, for example an additional Java software code, script or other command, is specified to be run at a particular extension point associated with a particular phase of a patching workflow, the patch orchestration engine causes the extension to be inserted into the patching workflow, for execution during patching of the targeted nodes, to modify that phase of the patching workflow.

DETAILED DESCRIPTION

In accordance with an embodiment, described herein is a system and method for providing support for custom hooks during patching in an application server, enterprise, cloud computing, or other computing environment. A patch orchestration engine generates a patching workflow including a series of steps that apply patches to update one or more targeted nodes in a controlled manner with minimal downtime. Custom hooks provide a flexible mechanism that enables modifying phases of the patching workflow that can be associated with extension points. When an extension, for example an additional Java software code, script or other command, is specified to be run at a particular extension point associated with a particular phase of a patching workflow, the patch orchestration engine causes the extension to be inserted into the patching workflow, for execution during patching of the targeted nodes, to modify that phase of the patching workflow.

Application Server (e.g., Multi-Tenant, MT) Environment

Figure 1:
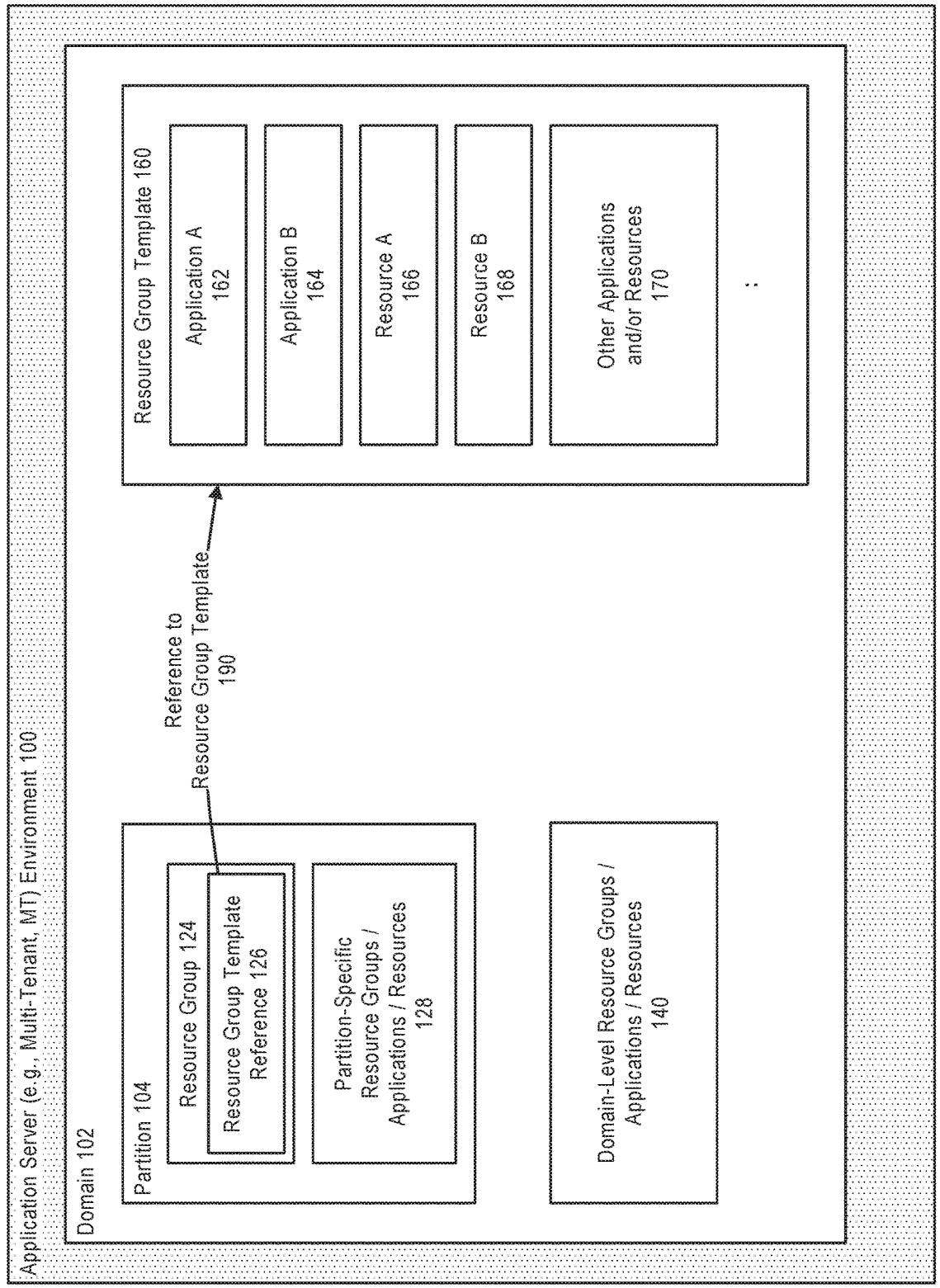
FIG. 1 illustrates a system for supporting multi-tenancy in an application server, cloud, or other computing environment, in accordance with an embodiment.

FIG. 1 illustrates a system for supporting multi-tenancy in an application server, cloud, or other computing environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
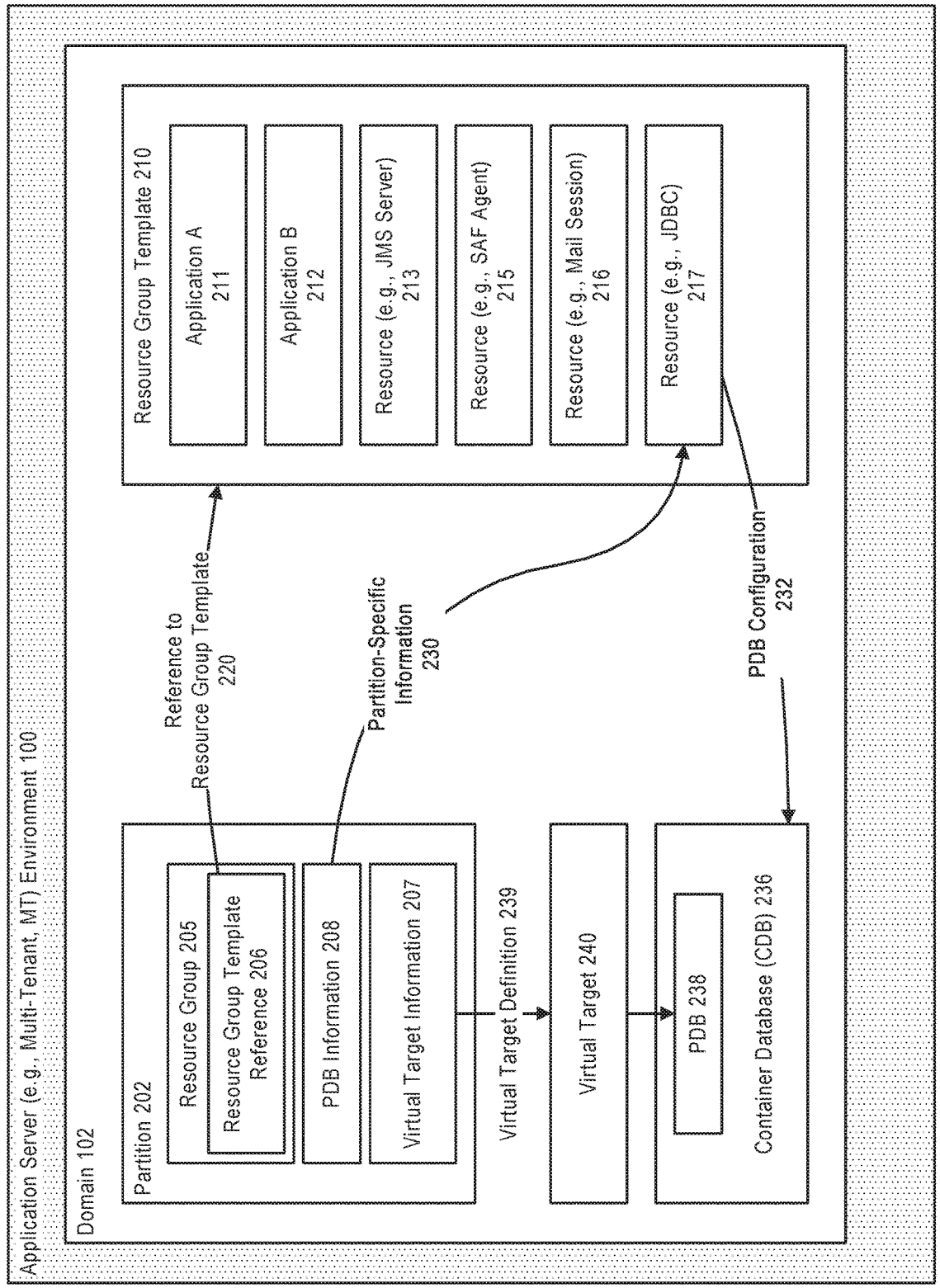
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
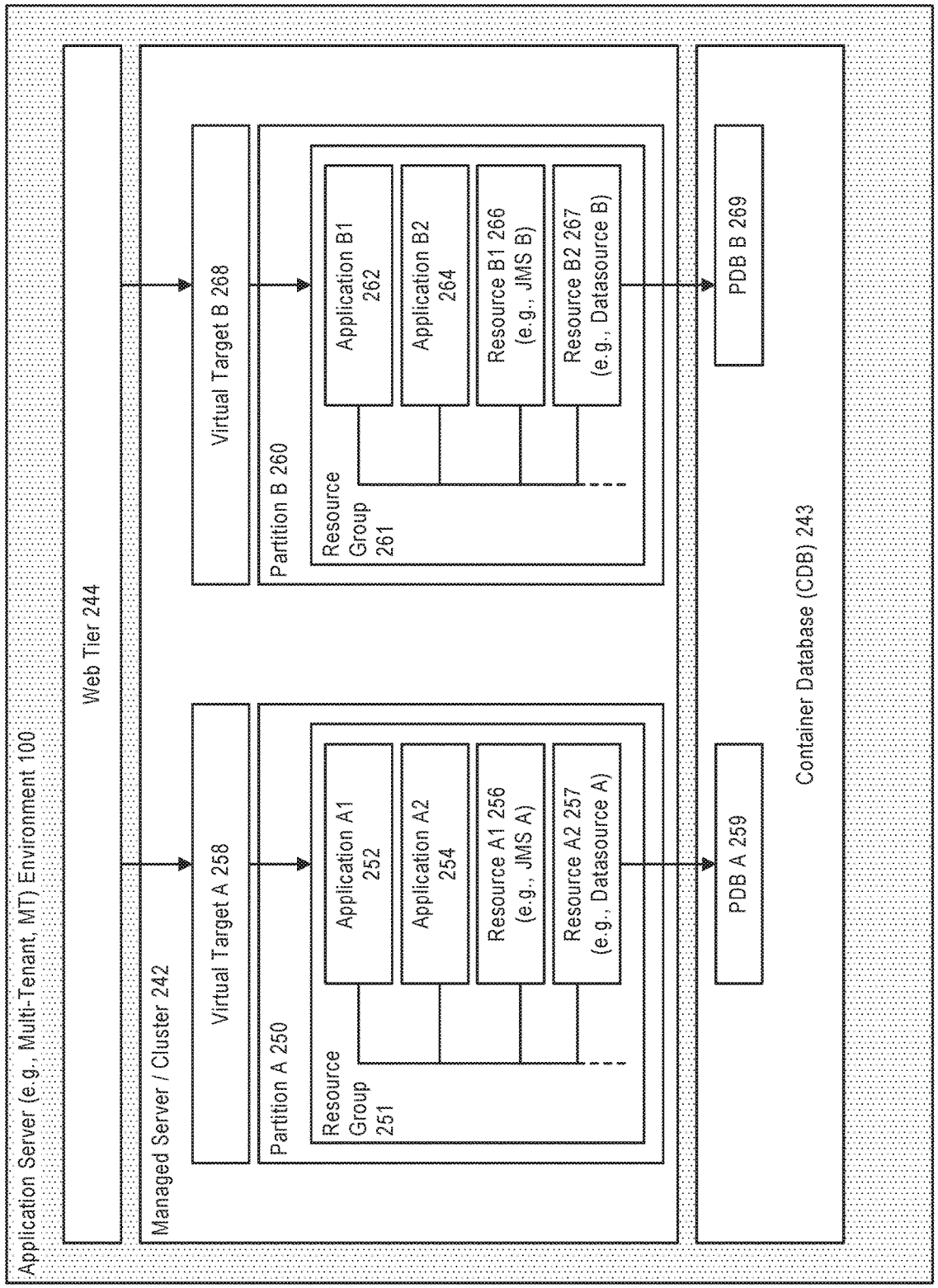
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRM DataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
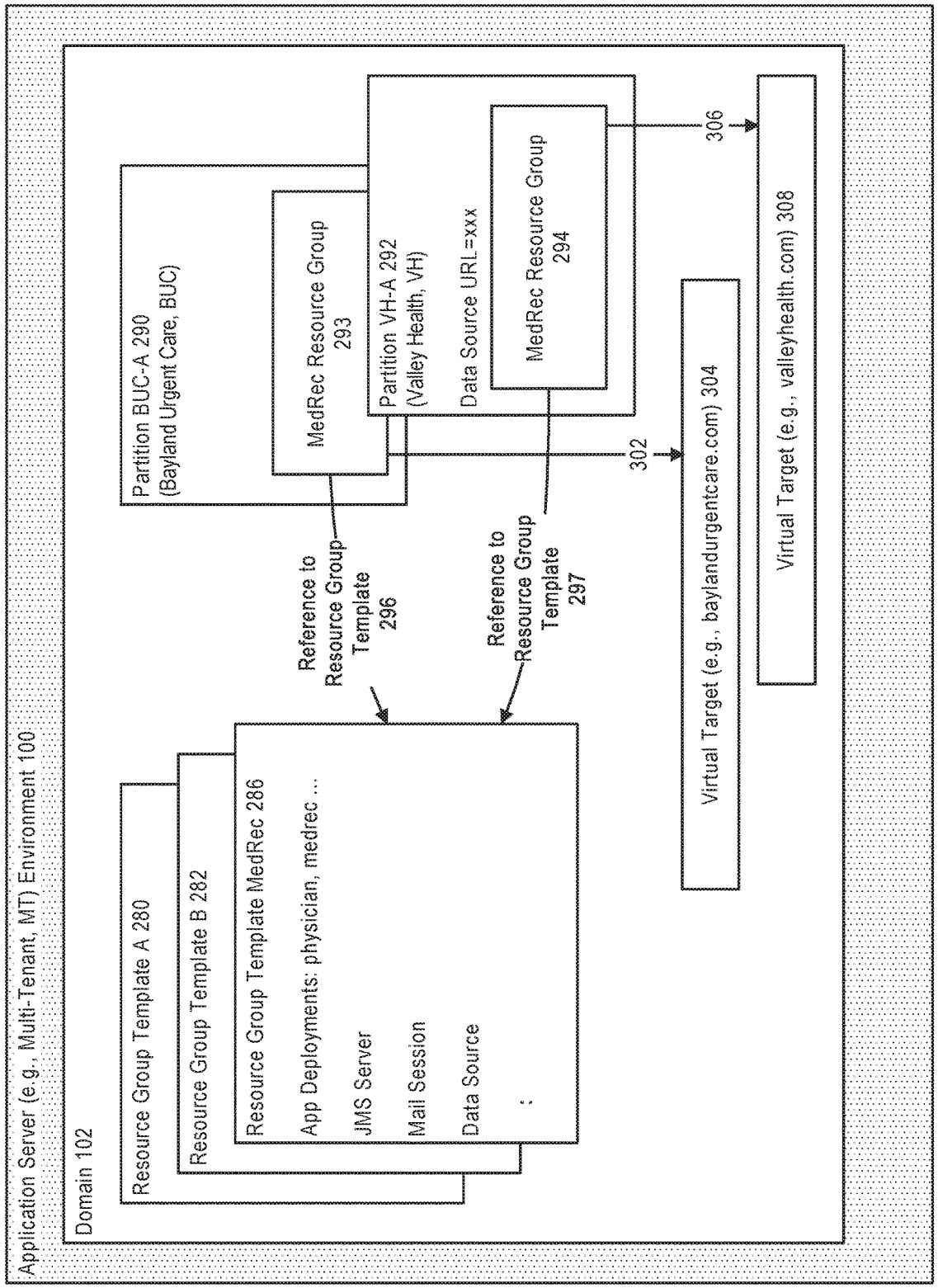
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
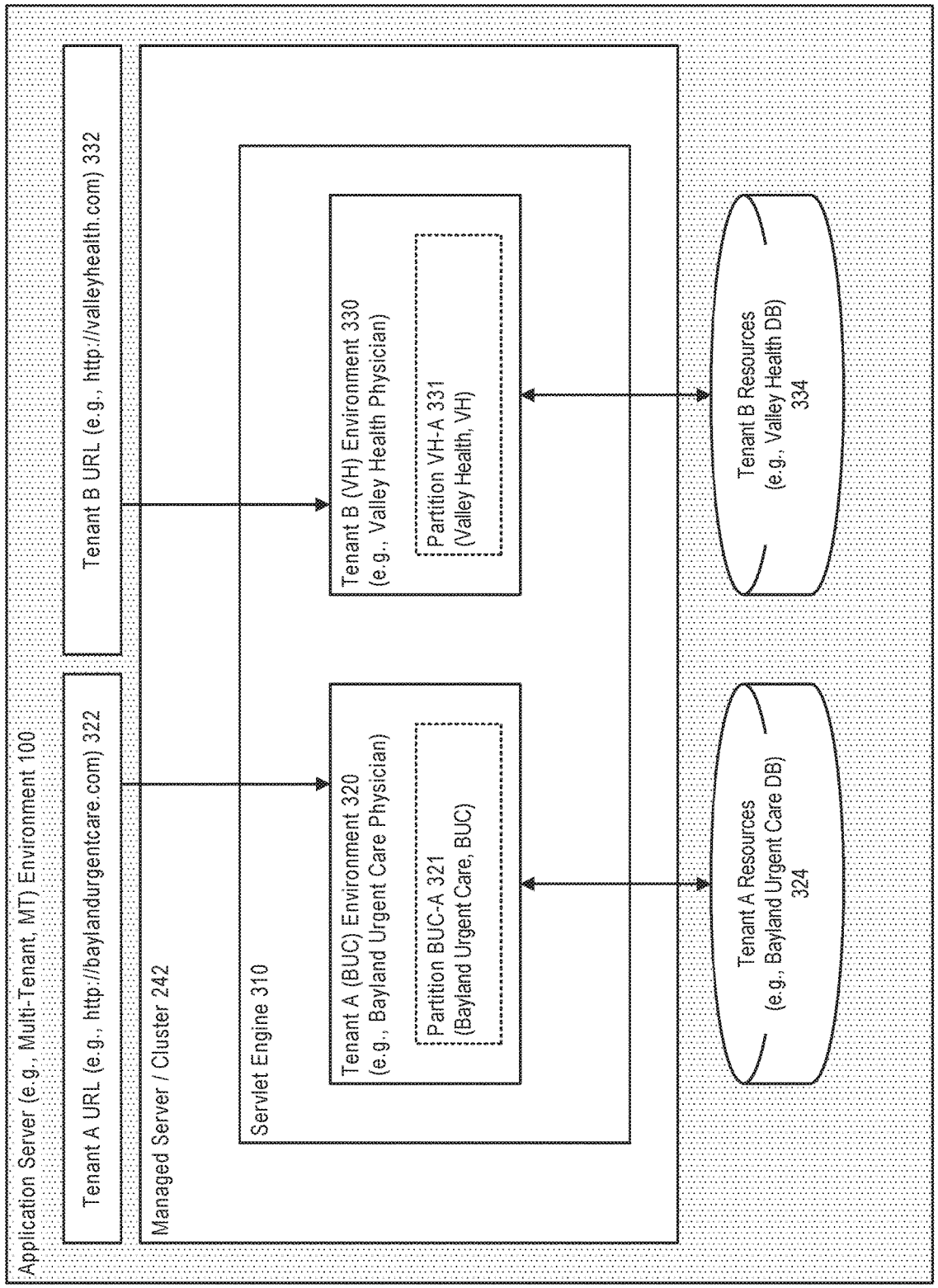
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Multitenant-Aware Patching

In accordance with an embodiment, the system can associate one or more partitions with a tenant, for use by that tenant, wherein a partition is a runtime and administrative subdivision or slice of a domain. A patching process can take advantage of high-availability features provided by an application server clustering environment, to apply patches in a controlled, rolling restart, which maintains a domain's ability to operate without interruption, or with zero downtime. The process can be used to automate complex or long running tasks, including preserving an unpatched or prior version of an application server, application, or other software component for possible rollback, or providing automatic reversion in the event of an unrecoverable error.

In accordance with various embodiments, the description of the patching process provided herein uses some or all of the following features:

PSU: a patch set update;

ZDT: zero downtime patching;

Patching workflow: a sequence of tasks executed by an orchestration framework or patch orchestration engine;

Patching primitive: a logical operation representing a reusable portion of the patching rollout; and Out-of-place patching: the patching of an, e.g., Oracle Home that is running on a nonproduction server, then testing and verifying the patches before pushing it out to production server, in an out of band patching and testing manner that requires less downtime of the production servers and provides the ability to more easily rollback the original version if needed.

In accordance with an embodiment, patching primitives are operations needed to gracefully perform the rolling restarts needed by the out-of-place patching solution, examples of which can include:

Support for retry—this is true if the primitive has behavior that should be tried again if it fails the first time. This could be used for a primitive that depends on the state of another object that might be transitioning, like a service coming up, or to handle intermittent failures like an unreliable connection.

Support for revert—this is true if the primitive has a logical 'undo' operation that can be performed in the event that the patching workflow it belongs to is being reverted. If a primitive defines any special behavior for the revert case, it will be described here.

Customized resume—a patching workflow can be resumed after it has paused due to an admin server restart. There is an interface that allows a primitive the opportunity to override the standard resume functionality, maybe to recheck some prerequisites to make sure they still hold true. If a primitive defines any special behavior for the resume case, it will be described here.

Ignore failures—this will be true for a primitive that is executed as part of a patching workflow, but should not cause the patching workflow to revert if the primitive does not complete successfully. This might be used by a primitive that attempts an operation that is not critical to the success of the patching workflow.

Support for Custom Hooks

In accordance with an embodiment, the system provides support for custom hooks during patching in an application server, enterprise, cloud computing, or other computing environment. A patch orchestration engine generates a patching workflow including a series of steps that apply patches to update one or more targeted nodes in a controlled manner with minimal downtime. Custom hooks provide a flexible mechanism that enables modifying phases of the patching workflow that can be associated with extension points. When an extension, for example an additional Java software code, script or other command, is specified to be run at a particular extension point associated with a particular phase of a patching workflow, the patch orchestration engine causes the extension to be inserted into the patching workflow, for execution during patching of the targeted nodes, to modify that phase of the patching workflow.

FIGS. 6-9 illustrate support for custom hooks during patching, in accordance with an embodiment.

Figure 6:
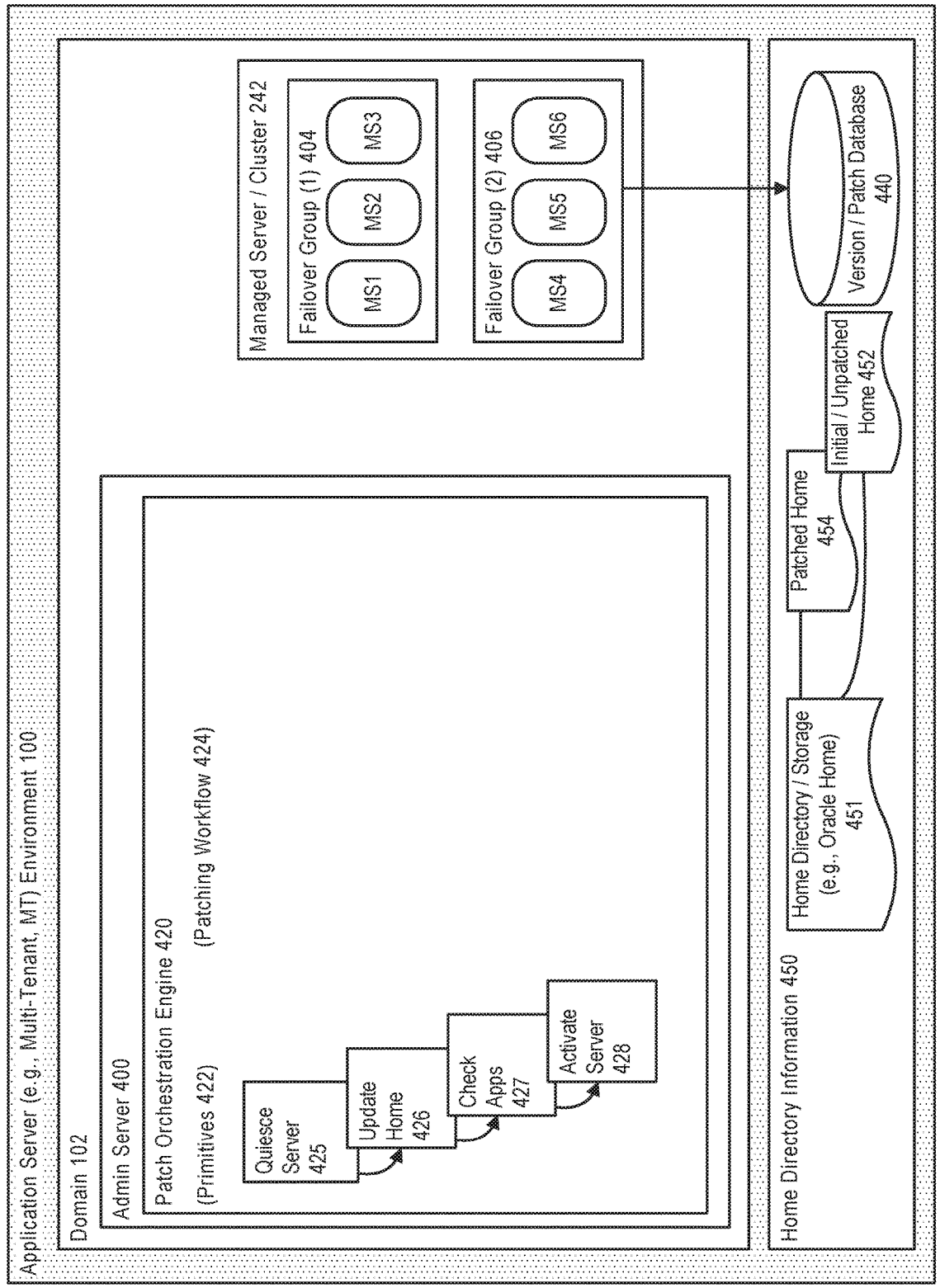
FIG. 6 illustrates support for custom hooks during patching, in accordance with an embodiment.

As illustrated in FIG. 6, in accordance with an embodiment, the system includes an administration server (admin server) 400, which is responsible for administering a managed server or cluster, including in this example a first failover group 404 of managed servers (here indicated as MS1, MS2 and MS3), and a second failover group 406 of managed servers (here indicated as MS4, MS5 and MS6).

In accordance with an embodiment, the system also includes a patch orchestration engine 420, which operates to roll out and/or apply different versions of software components, or patches, using a plurality of patching primitives 422, as part of a patching workflow 424.

Generally, the patch orchestration engine operates in a robust manner, and includes support for functionality such as task retry, and rollback semantics.

In accordance with an embodiment, examples of patching primitives that are supported by the patch orchestration engine include Quiesce Server 425, which communicates with a traffic director or other type of load balancer, for example an Oracle Traffic Director (OTD), to quiesce traffic to a specified server; Update Home 426, which changes a home directory or other storage's (e.g., Oracle Home) symbolic link (symlink) to point to a new target; Check Apps 427, which communicates with a ready app or similar framework, and completes only when all registered applications are in a ready state; and Activate Server 428, which communicates with, e.g., OTD, to resume sending traffic to a specified server.

In accordance with an embodiment, the patch orchestration engine, together with its primitives and patching workflow, can be used in combination with a patch database 440, to support different versions of software components, or patches, including, for example, the information required to patch or update a set of home directories or other storages 450, for one or more managed servers 451, from an initial patched, or an unpatched version 452, to a subsequently-patched version 454.

Figure 7:
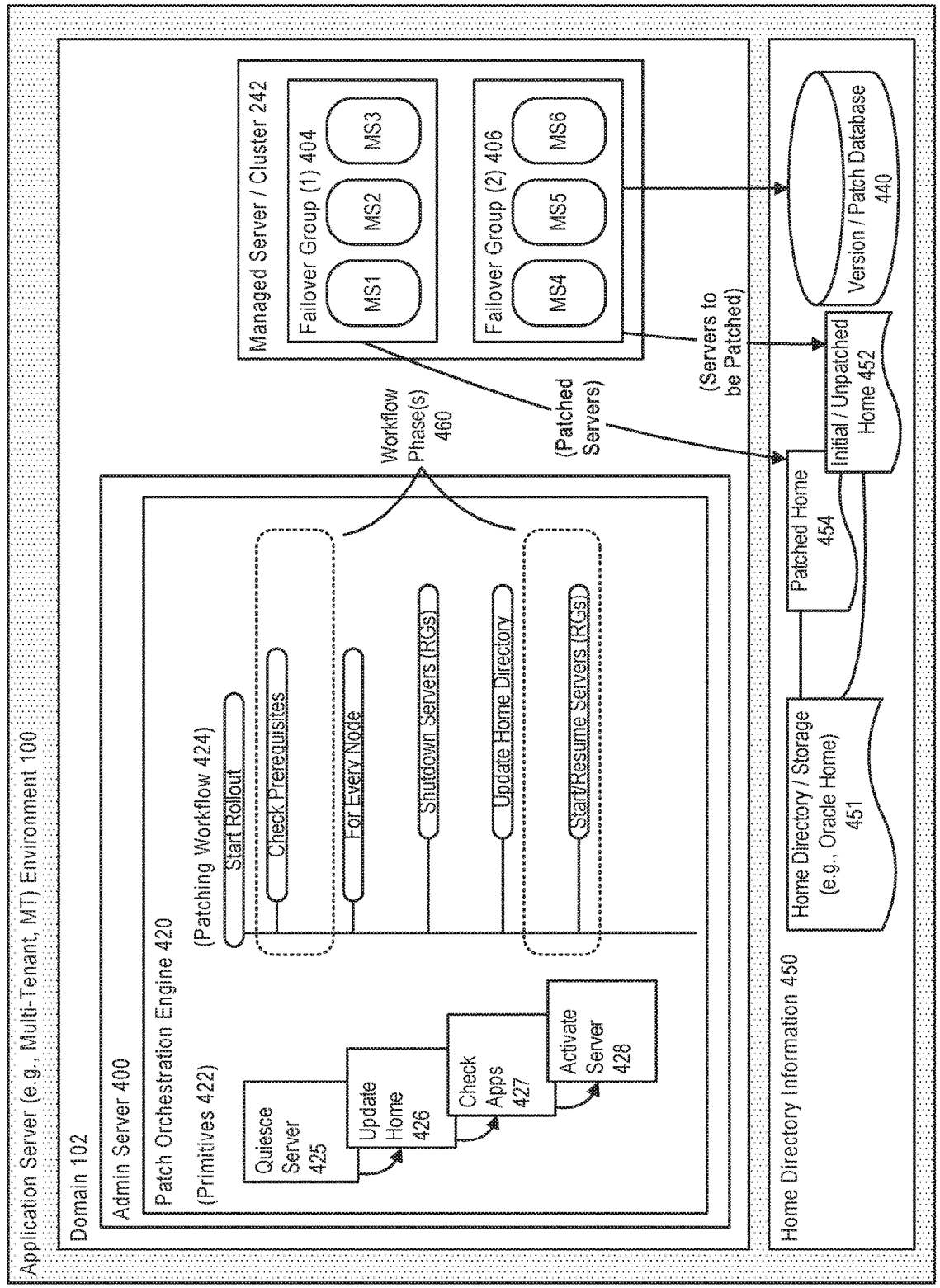
FIG. 7 further illustrates support for custom hooks, in accordance with an embodiment.

For example, as illustrated in FIG. 7, the cluster can include two failover groups of managed servers as described above, in which the first failover group and its selection of the managed servers (MS1, MS2 and MS3) use a patched version of the home directory, while a second failover group and the others of the managed servers (MS4, MS5 and MS6) use an initial, or unpatched, version of the home directory.

In accordance with an embodiment, custom hooks enable development teams and end users to modify or augment the patching rollouts at various phases 460 by, for example, executing additional Java or script commands. This functionality can be used for different types of purposes, for example: to modify Java properties files while the servers are down (for ex. changing some security settings in the Java Home); to add HA security mode checks between node upgrades; to perform additional backup operations on each node; in Fusion Apps environments to have additional steps performed as part of the rollout of patched application versions; to run any scripts on cloud servers (hosting layered PaaS services) while upgrading services; or any other operation that is specific to a particular type of rollout but is not appropriate to include in the base patching workflows.

In accordance with an embodiment, the patching workflows used to perform the rollouts are created in a factory class called the RolloutUpdatePrimitiveFactory. This factory takes user input parameters about what type of rollout to perform, and analyzes the topology of the current domain, to generate a series of steps to iterate through the targeted nodes, shutdown affected servers, perform the relevant updates, and bring the servers back to their original running state, while preserving user sessions and ensuring continuous availability of the services.

Figure 8:
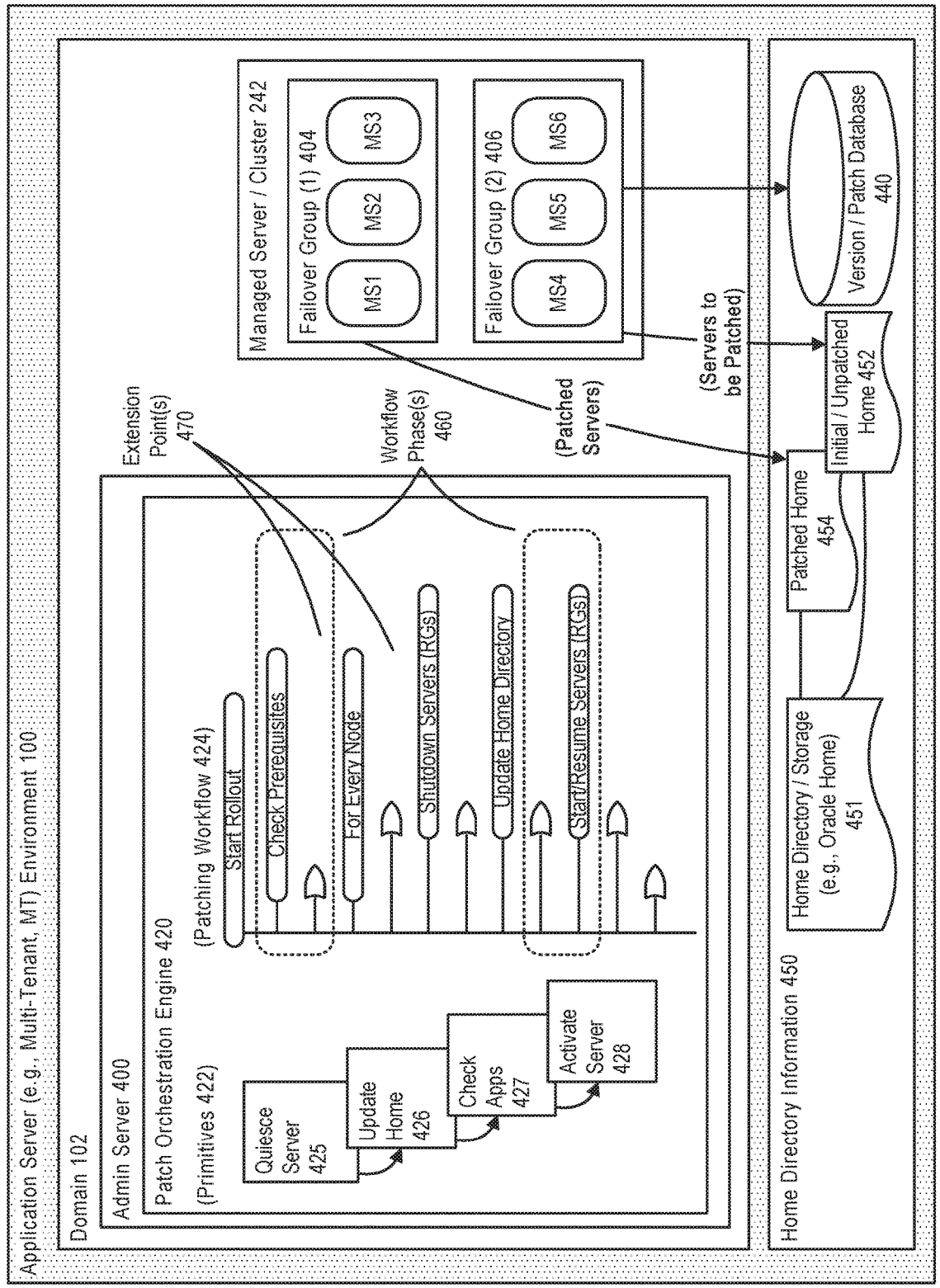
FIG. 8 further illustrates support for custom hooks, in accordance with an embodiment.

As illustrated in FIG. 8, in accordance with an embodiment, custom hooks are used to update this factory to identify one or more extension points 470 in the building of the patching workflow where additional, e.g., Java software code, or another command or extension, can be executed. When a user specifies an extension, for example a software code, script, command, or other type of extension to be run at one or more of the extension points, the extension will be inserted into the patching workflow by the factory.

Figure 9:
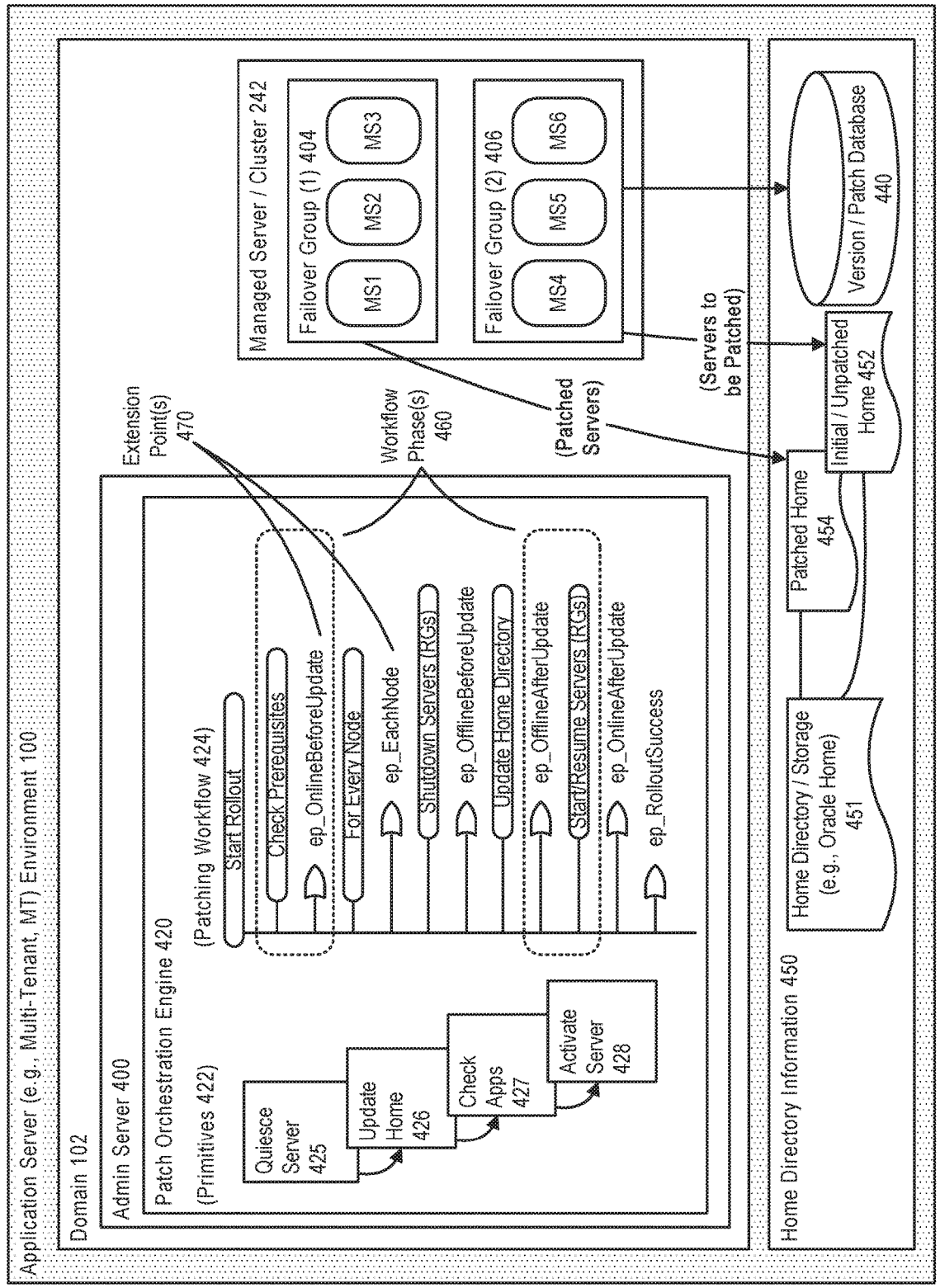
FIG. 9 further illustrates support for custom hooks, in accordance with an embodiment.

For example, as illustrated in FIG. 9, in accordance with an embodiment, when an extension, for example an additional Java software code, script or other command, is specified to be run at a particular extension point associated with a particular phase of a patching workflow, the patch orchestration engine causes the extension to be inserted into the patching workflow, for execution during patching of the targeted nodes, to modify that phase of the patching workflow.

Non-MT Rollout

In accordance with an embodiment, extensions may run on the admin server, or on remote nodes. Extensions registered for extension points will be executed on the node that is being updated at that point in the rollout. This might be on the admin node during a domain rollout, and then on each node in turn that is being updated. Extensions automatically have a failure plan of no retries; if the user wants retry functionality in their extension, they can include the logic within the extension. A logging interface can be provided so the user can include logging functionality in their extension that will be integrated with the logging from the rest of the patching workflow.

Multi-Tenancy (MT) Rollout

In accordance with an embodiment, in an MT rollout, a partition administrator is not guaranteed to have access to the admin server's filesystem. For MT rollouts with extensions, a partition administrator can use a workspace for storing extension jars. An additional consideration for multi-tenancy is safeguarding the privacy of other tenants, so that extensions run by a partition administrator don't interfere with or gather information about other partitions.

Specifying Extensions

In accordance with an embodiment, the user can specify an extension to be included in a rollout via a configuration file. The configuration file can be contained within an extension jar that may also contain related class files or native scripts. The user can also supply additional options that are interpreted by the specified extension. The format of the configuration file can be a JSON format file that contains an array of extension definitions. Each extension definition comprises the name of the extension point in the patching workflow where the extension is to be inserted, the fully qualified name of the class file to execute at that point, and optionally any additional parameters to be used by the extension, which can be similarly declared in JSON format.

An example of the extension configuration file can be illustrated as:

```
{"extensions":[
{
"extensionPoint":"ep_OnlineBeforeUpdate",
"extensionClass":"weblogic.management.patching.extensions.ScriptExecutorExten
sion",
"extensionParameters":"scriptName=checkJar.sh,jarPath=/tmp/extension.jar"
},
{
"extensionPoint":"ep_EachNode",
"extensionClass":"weblogic.management.patching.extensions.ScriptExecutorExten
sion",
"extensionParameters":"scriptName=checkDiskSpace.sh"
},
{
"extensionPoint":"ep_RolloutSuccess",
"extensionClass":"weblogic.management.patching.extensions.ScriptExecutorExten
sion",
"extensionParameters":{"scriptName":"emailSuccess.sh",
"appURL":"http://localhost:7005/context?param1=val1&param2=val2,http://localh
ost:7006/
context2?param1=val1&param2=val2"}
}
]}
```

In accordance with an embodiment, if more than one extension is specified for the same extension point, they will be executed in the order they are listed in the configuration file. If more than one extension jar is involved, the extensions for each extension point will be executed in the order they are encountered in the configuration files. Each extension jar should generally contain only one extension configuration file.

Extension Points on Remote Nodes

In accordance with an embodiment, extensions registered to run on remote nodes will be executed on the node that the patching workflow is updating at that point. In order to support this, the extension jar specified by the user that contains the classes to run and the extension configuration file should be transferred to the remote node before-hand. In cloud environments, managed server nodes are not accessible directly and are accessible only from the admin node. Hence it is important to support automatic transfer of extension jars to remote nodes. This can be accomplished using a command the node manager provides that will allow the admin server to transfer the file. Once the file is received by the node manager, it will be stored in a directory where it can be referenced by a ZDT Agent at the appropriate time.

In accordance with an embodiment, extensions executed on the remote node will provide logging the same way the ZDT Agent currently manages logging. All messages will be written out to a log file in the same directory, in a JSON format, in order to preserve timestamp and log level information. When the remote execution is done, the admin server will collect the logging data and add it to the admin server log. In accordance with an embodiment, a lightweight extension executor understands the order of extensions to be executed, will detect when one fails, and will revert the previous steps in reverse order if a failure occurs.

Extension Registration

In accordance with an embodiment, to handle the registration of extensions to extension points, an extension manager can be used, which is created at the start of each rollout. It will inspect the extension jar files specified as part of the rollout and parse the extension configuration files contained within them. During the patching workflow creation in the factory, a method can be used to get an extension primitive, the method will take the name of the extension point, and a reference to the extension manager. This method will query the extension manager and return a (new) patching workflow builder containing the extension information for each extension registered to that extension point, in the order the extensions were registered. The extension information includes the location of the extension jar containing any custom classes or scripts, as well as the parameters for that extension specified in the extension configuration file, as well as the parameters specified for that extension on the command line. When the patching workflow is created from this builder, the builder will dynamically load the class files from the appropriate extension jar, and initialize the Shared-State attributes appropriately.

Figure 10:
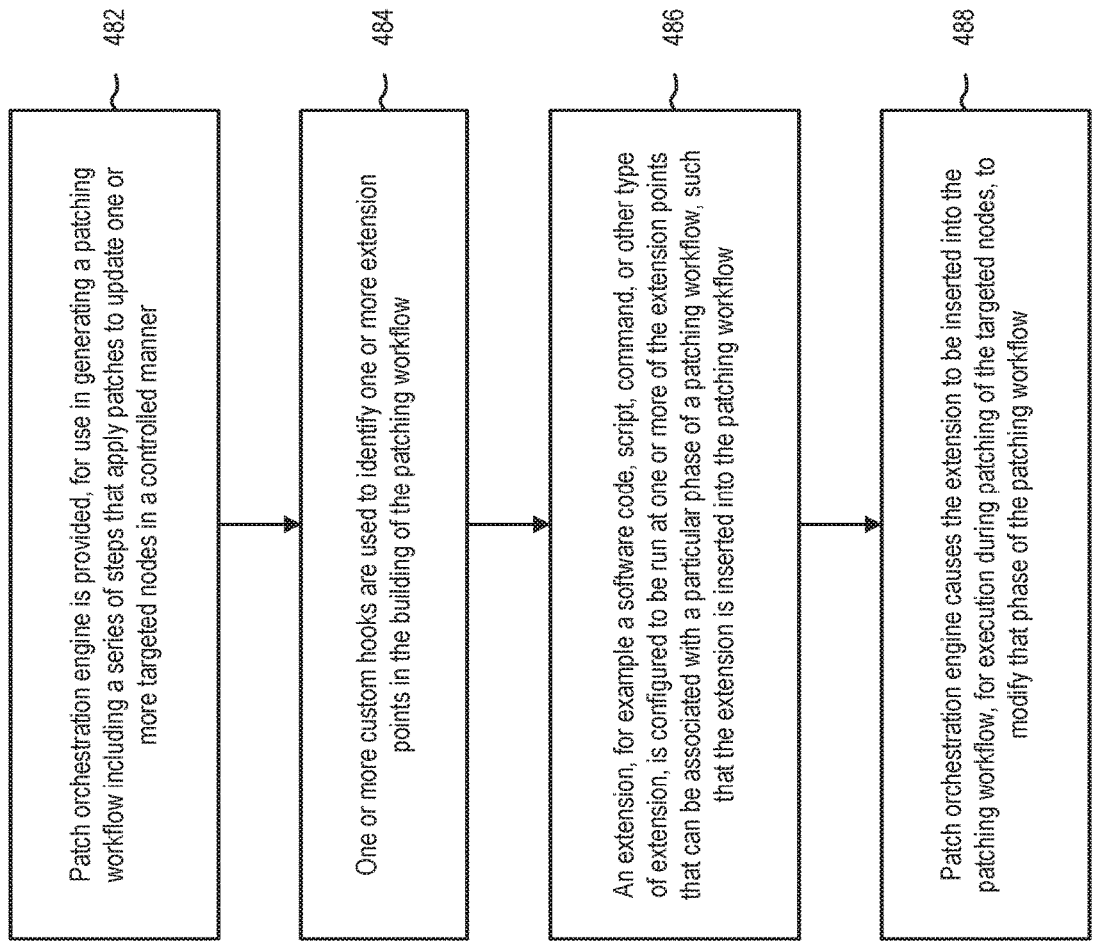
FIG. 10 illustrates a process for supporting custom hooks, in accordance with an embodiment.

FIG. 10 illustrates a process for supporting custom hooks during patching, in accordance with an embodiment.

As illustrated in FIG. 10, in accordance with an embodiment, at step 482, a patch orchestration engine is provided, for use in generating a patching workflow including a series of steps that apply patches to update one or more targeted nodes in a controlled manner.

At step 484, one or more custom hooks are used to identify one or more extension points in the building of the patching workflow.

At step 486, an extension, for example a software code, script, command, or other type of extension, is configured to be run at one or more of the extension points that can be associated with a particular phase of a patching workflow, such that the extension is inserted into the patching workflow.

At step 488, the patch orchestration engine causes the extension to be inserted into the patching workflow, for execution during patching of the targeted nodes, to modify that phase of the patching workflow.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing support for custom hooks during patching in an application server, enterprise, cloud computing, or other computing environment, comprising:
   at least one computer having a computing environment executing thereon, together with a plurality of managed server nodes that operate as part of a domain for execution of software applications;
   wherein the computing environment operates a patching workflow performed by a plurality of patching primitives during phases of the patching workflow and including a series of steps that apply patches to update a plurality of targeted nodes within the plurality of managed server nodes, in a controlled rolling restart, from one of an initial patched or an unpatched version, to a subsequently patched version;
   wherein each patching primitive is adapted to perform an operation of the patching workflow during one or more phases of the patching workflow, wherein the phases are associated with extension points specified by a configuration file;
   wherein the configuration file specifies a plurality of extension definitions, including for each extension definition a name of an extension point in the patching workflow where an associated extension is to be inserted, and an executable code or command to execute at that extension point; and
   wherein an extension manager parses the configuration file to cause an extension to be associated with a particular phase of the patching workflow, for execution during patching of targeted nodes, including that:
      the configuration file indicates, for each of the extension definitions therein, the extension point in the patching workflow where the extension is to be inserted, and the name of the executable code or command to execute;
      a patch orchestration engine generates the patching workflow to apply patches to update the targeted nodes,
         wherein the extension point is associated with a particular phase of the patching workflow, and
         wherein during generation of the patching workflow, the patch orchestration engine causes an associated extension to be inserted into the patching workflow, for execution during patching of the targeted nodes; and
      during building of the patching workflow for use with the targeted nodes, the extension associated with the extension point is inserted into the patching workflow for execution in association with the patching primitives during the particular phase of patching of the targeted nodes, to modify the particular phase of the patching workflow for use in patching of the targeted nodes, including that extensions registered to run on particular targeted nodes are executed on those nodes that the patching workflow is updating at that point.

2. The system of claim 1, wherein the computing environment operates according to a domain configuration that defines the domain and a plurality of partitions;
   wherein each partition provides an administrative and runtime subdivision of the domain, including:
   a first partition of the domain, associated with first partition identifier and partition configuration and having a first partition-level resource group that is accessible via a first virtual target, and a second partition of the domain, associated with second partition identifier and partition configuration and having a second partition-level resource group that is accessible via a second virtual target.

3. The system of claim 1, wherein the system is provided within a cloud environment, and supports multiple tenants operating within the cloud environment.

4. The system of claim 1, wherein each extension that can be associated with an extension point includes at least one of a software code, script or command specified to be run at an extension point, and wherein a plurality of extension points are associated with one or more phases of the patching workflow, for execution of their associated extensions during patching of the targeted nodes.

5. The system of claim 4, wherein the plurality of extension points are associated with a plurality of phases of the patching workflow, for execution of their associated extensions during selectable phases of the plurality of phases.

6. The system of claim 1, wherein a plurality of extensions associated with a particular extension point are associated with a configurable order by those extensions are executed.

7. The system of claim 1, wherein the system creates the patching workflows by:
  determining a type of rollout to perform; and
  analyzing a topology of the current domain, to generate a series of steps to iterate through the targeted nodes, shutdown affected servers, perform updates, and bring the servers back to a running state, while preserving user sessions and providing continuous availability of services.

8. The system of claim 1, wherein when an extension is registered to run on remote nodes, an extension configuration file is transferred to the remote nodes before patching, wherein the configuration file is received and stored in a directory where it can be subsequently referenced during patching of the remote nodes.

9. A method for providing support for custom hooks during patching in an application server, enterprise, cloud computing, or other computing environment, comprising:
  providing, at one or more computers, a computing environment executing thereon, together with a plurality of managed server instances that operate as part of a domain for execution of software applications;
  wherein the computing environment operates a patching workflow performed by a plurality of patching primitives during phases of the patching workflow and including a series of steps that apply patches to update a plurality of targeted nodes within the plurality of managed server nodes, in a controlled rolling restart, from one of an initial patched or an unpatched version, to a subsequently patched version;
  wherein each patching primitive is adapted to perform an operation of the patching workflow during one or more phases of the patching workflow, wherein the phases are associated with extension points specified by a configuration file; and
  wherein the configuration file specifies a plurality of extension definitions, including for each extension definition a name of an extension point in the patching workflow where an associated extension is to be inserted, and an executable code or command to execute at that extension point; and
  wherein an extension manager parses the configuration file to cause an extension to be associated with a particular phase of the patching workflow, for execution during patching of targeted nodes, including that:
    the configuration file indicates, for each of the extension definitions therein, the extension point in the patching workflow where the extension is to be inserted, and the name of the executable code or command to execute;
  a patch orchestration engine generates the patching workflow to apply patches to update the targeted nodes,
    wherein the extension point is associated with a particular phase of the patching workflow, and
    wherein during generation of the patching workflow, the patch orchestration engine causes an associated extension to be inserted into the patching workflow, for execution during patching of the targeted nodes; and
  during building of the patching workflow for use with the targeted nodes, the extension associated with the extension point is inserted into the patching workflow for execution in association with the patching primitives during the particular phase of patching of the targeted nodes, to modify the particular phase of the patching workflow for use in patching of the targeted nodes, including that extensions registered to run on particular targeted nodes are executed on those nodes that the patching workflow is updating at that point.

10. The method of claim 9, wherein the computing environment operates according to a domain configuration that defines the domain and a plurality of partitions;
  wherein each partition provides an administrative and runtime subdivision of the domain, including:
  a first partition of the domain, associated with first partition identifier and partition configuration and having a first partition-level resource group that is accessible via a first virtual target, and
  a second partition of the domain, associated with second partition identifier and partition configuration and having a second partition-level resource group that is accessible via a second virtual target.

11. The method of claim 9, wherein the method is provided within a cloud environment, and supports multiple tenants operating within the cloud environment.

12. The method of claim 9, wherein each extension that can be associated with an extension point includes at least one of a software code, script or command specified to be run at an extension point, and wherein a plurality of extension points are associated with one or more phases of the patching workflow, for execution of their associated extensions during patching of the targeted nodes.

13. The method of claim 9, wherein a plurality of extensions associated with a particular extension point are associated with a configurable order by those extensions are executed.

14. A non-transitory computer readable storage medium, including instructions stored thereon which when read and executed by one or more computers cause the one or more computers to perform the method comprising:
  providing, at one or more computers, a computing environment executing thereon, together with a plurality of managed server instances that operate as part of a domain for execution of software applications;
  wherein the computing environment operates a patching workflow performed by a plurality of patching primitives during phases of the patching workflow and including a series of steps that apply patches to update a plurality of targeted nodes within the plurality of managed server nodes, in a controlled rolling restart, from one of an initial patched or an unpatched version, to a subsequently patched version;

wherein each patching primitive is adapted to perform an operation of the patching workflow during one or more phases of the patching workflow, wherein the phases are associated with extension points specified by a configuration file; and wherein the configuration file specifies a plurality of extension definitions, including for each extension definition a name of an extension point in the patching workflow where an associated extension is to be inserted, and an executable code or command to execute at that extension point; and wherein an extension manager parses the configuration file to cause an extension to be associated with a particular phase of the patching workflow, for execution during patching of targeted nodes, including that:

the configuration file indicates, for each of the extension definitions therein, the extension point in the patching workflow where the extension is to be inserted, and the name of the executable code or command to execute;

a patch orchestration engine generates the patching workflow to apply patches to update the targeted nodes, wherein the extension point is associated with a particular phase of the patching workflow, and wherein during generation of the patching workflow, the patch orchestration engine causes an associated extension to be inserted into the patching workflow, for execution during patching of the targeted nodes; and during building of the patching workflow for use with the targeted nodes, the extension associated with the extension point is inserted into the patching workflow for execution in association with the patching primitives during the particular phase of patching of the targeted nodes, to modify the particular phase of the patching workflow for use in patching of the targeted nodes, including that extensions registered to run on particular targeted nodes are executed on those nodes that the patching workflow is updating at that point.

15. The non-transitory computer readable storage medium of claim 14, wherein the computing environment operates according to a domain configuration that defines the domain and a plurality of partitions;

wherein each partition provides an administrative and runtime subdivision of the domain, including:

a first partition of the domain, associated with first partition identifier and partition configuration and having a first partition-level resource group that is accessible via a first virtual target, and a second partition of the domain, associated with second partition identifier and partition configuration and having a second partition-level resource group that is accessible via a second virtual target.

16. The non-transitory computer readable storage medium of claim 14, wherein the method is provided within a cloud environment, and supports multiple tenants operating within the cloud environment.

17. The non-transitory computer readable storage medium of claim 14, wherein each extension that can be associated with an extension point includes at least one of a software code, script or command specified to be run at an extension point, and wherein a plurality of extension points are associated with one or more phases of the patching workflow, for execution of their associated extensions during patching of the targeted nodes.

* * * * *